United States Patent [19]

Huelster

[11] 4,366,894
[45] Jan. 4, 1983

[54] SIDE FRAME ASSEMBLY FOR ROLLER CONVEYOR SYSTEMS

[75] Inventor: Richard L. Huelster, Indianapolis, Ind.

[73] Assignee: Pentek Corporation, Indianapolis, Ind.

[21] Appl. No.: 344,397

[22] Filed: Feb. 1, 1982

Related U.S. Application Data

[63] Continuation of Ser. No. 135,279, Mar. 31, 1980, abandoned.

[51] Int. Cl.³ .............................................. B65G 13/12
[52] U.S. Cl. .................................................. 193/35 R
[58] Field of Search .............. 193/35 R, 35 J; 52/732, 52/726; 198/780, 860; 403/345, 363; 46/26, 29; 211/162

[56] References Cited

U.S. PATENT DOCUMENTS

| | | | |
|---|---|---|---|
| 2,696,283 | 12/1954 | Barry | 193/35 R |
| 3,252,556 | 5/1966 | Isacsson | 193/35 R |
| 3,890,755 | 6/1975 | Specht | 193/35 R X |
| 3,915,275 | 10/1975 | Specht | 193/35 R |
| 3,924,718 | 12/1975 | Kornylak | 193/35 R |
| 4,056,180 | 11/1977 | Gunti | 193/35 R |
| 4,232,774 | 11/1980 | Gunti | 193/35 J |

Primary Examiner—Andres Kashnikow
Assistant Examiner—Gene A. Church
Attorney, Agent, or Firm—Jenkins, Coffey, Hyland, Badger & Conard

[57] ABSTRACT

A profiled upright side support rail for supporting rollers for rotation about transverse axes suitably spaced apart in the longitudinal direction of a conveyor system is generally L-shaped in cross section and is elevated in spaced relationship to a base by leg angles. The rail includes a generally inwardly extending flange and a generally upwardly extending web portion angularly formed with the flange. The web portion of the rail is generally Y-shaped in cross section and includes a side member, at least three planar sections each provided in a different generally vertical plane, an inwardly projecting shoulder section, and an inwardly extending oblique section. An upper section of the web includes a plurality of upwardly opening notches for supporting the rollers, the notches being spaced apart longitudinally along the upper section by distances equal to desired spacing between the transverse axes of the rollers.

17 Claims, 4 Drawing Figures

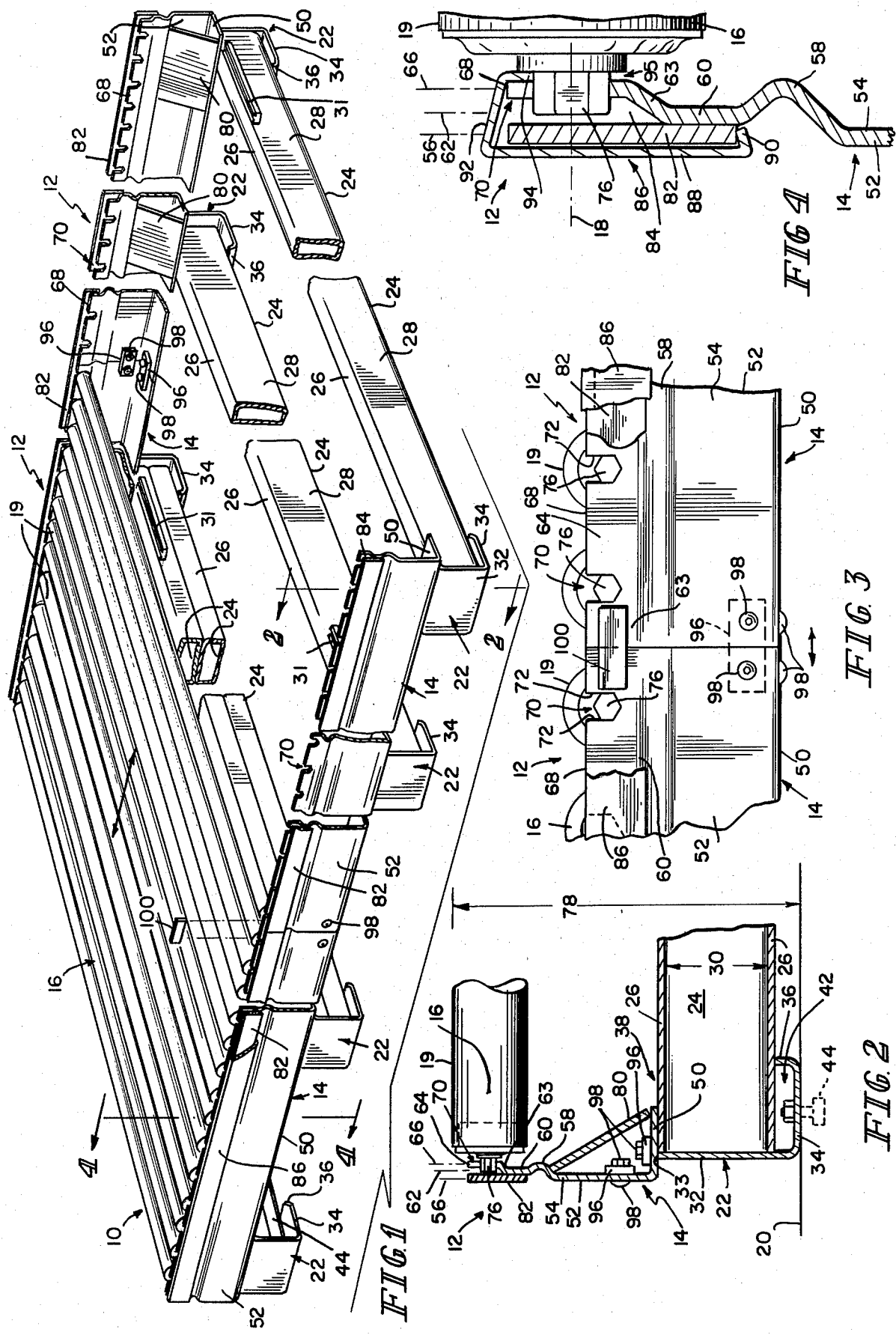

SIDE FRAME ASSEMBLY FOR ROLLER CONVEYOR SYSTEMS

This is a continuation of application Ser. No. 135,279 filed Mar. 31, 1980, now abandoned.

The present invention relates to roller conveyors of the type which include two or more parallel, elongated side support members of a frame assembly and rollers supported by the support members for rotation about transverse axes. More particularly, the present invention is concerned with improvements in side frame assemblies and support members for roller conveyor systems.

Various side frame assemblies for roller conveyor systems are well known in the art. For example, U.S. Pat. Nos. 3,035,683; 3,252,556; 3,540,561; 3,890,755; 3,915,275; and 4,056,180 disclose and describe some of these prior side frame assemblies and support members for roller conveyor systems.

Most of these prior side frame assemblies and support members present at least two problems. First, the complete frame assemblies or support members rest upon the base or floor surface so that it is difficult or impossible to get underneath them. Second, the frame assemblies and support members include protuberances which project outwardly from the outer surface of the frame assemblies or support members and present snags to objects passing in relative close proximity to the conveyor system.

It is therefore one object of the present invention to provide a side frame assembly for roller conveyor systems which includes support members elevated in spaced relationship to the base or floor surface to allow access underneath the frame assembly.

It is a further object of the present invention to provide support members for a side frame assembly which include an outer surface contained generally within a single plane and which do not have protuberances projecting therefrom.

According to the present invention, improved elongated side rails for supporting rollers for rotation about transverse axes which are suitably spaced apart in the longitudinal direction of the conveyor system are generally L-shaped in cross section and include a generally inwardly extending flange portion and a generally upwardly extending web portion angularly formed with the flange portion which is generally Y-shaped in cross section and forms an upwardly opening channel.

Further according to the present invention, the web portion of the profiled upright rails includes at least three planar sections, each provided in a different generally vertical plane wherein one of the planar sections in conjunction with a side members form the upwardly opening channel which is generally Y-shaped in cross section.

A side frame assembly for a conveyor system constructed according to the present invention includes two parallel upright side support members elongated for supporting rollers for rotation about transverse axes suitably spaced apart in the longitudinal direction of the conveyor system, the side support members each including an upwardly extending web and a flange angularly extending from the web, at least two leg angles for elevating each of the support members in spaced relationship to a base surface, the leg angles each including an upwardly extending web, a flange inwardly extending from the web, and a lip upwardly extending from the flange, and at least one cross-member connecting the two leg angles and forming a planar support surface for the side support members, the cross member also being elevated in spaced relationship to the base by the upturned lips of the leg angles.

Various other features and advantages of the present invention will become apparent from the following detailed description of an embodiment thereof, which description should be viewed in conjunction with the accompanying drawings, in which:

FIG. 1 is a partly sectioned and partly broken-away perspective view of a side frame assembly constructed according to the present invention;

FIG. 2 is a cross-sectional view of the side frame assembly of FIG. 1, taken generally along section lines 2—2;

FIG. 3 is a partly broken-away fragmentary side elevational view of the side frame assembly of FIG. 1 illustrating the coupling between two of the assembly sections; and FIG. 4 is an enlarged fragmentary cross-sectional view of the side frame assembly of FIG. 1, taken generally along section lines 4—4.

Referring now to FIG. 1, a roller conveyor system 10 may include one or more frame assembly sections 12 constructed according to the present invention. Each frame assembly section 12 embodying the present invention includes two parallel elongated side support members, generally identified by numeral 14, for supporting a plurality of rollers 16 for rotation about transverse axes 18 (as can best be seen in FIG. 4) which are suitably spaced apart in the longitudinal direction of the conveyor 10, as indicated by the arrows in FIGS. 1 and 3. As can best be seen in FIGS. 2-4, the top surfaces 19 of the rollers 16 are supported above the support members 14 to facilitate placement and removal of articles. Each of the side support members 14 is a rigid profiled upright rail having a generally L-shaped cross section and is fabricated, illustratively, from hot-rolled steel having a thickness of approximately 0.164 inch (0.417 cm.).

The two parallel side support members 14 of each assembly section 12 are elevated in spaced relationship to the base or floor surface 20 to which the conveyor system 10 is attached by four leg angles 22, that is, legs having an L-shaped cross section, with two leg angles 22 elevating each of the side support members 14. The leg angles 22 associated with each support member 14 are diametrically opposed to the two leg angles 22 associated with the other support member 14. Each pair of opposed leg angles 22 is connected by a hollow rectangular cross-tie member 24 which fixes the two side support members 14 in a predetermined spaced parallel relationship determined by the length of the rollers 16. Each of the rectangular cross-tie members 24 includes two short sides 26 and two long sides 28. Importantly, the long sides 28 of the cross-tie members 24 have a width 30 which is generally twice the width of the short sides 26 of the rectangular cross-tie members 24. As illustrated in FIG. 1, it is therefore possible to use a cross-tie member 24 turned on one of its short sides 26 to connect two opposing leg angles 22 or to stack two cross-tie members 24 turned on their long sides 28 to provide additional strength for supporting the side support members 14 in various load-bearing zones of the conveyor system 10. Secured to selected cross-tie members 24 are conduit support brackets 31 which are generally C-shaped in cross section and approximately 12.00 inches (30.48 cm.) in length. These brackets 31 are employed to support and hold electrical and/or fluid conduits (not shown) in spaced relationship to the base or floor surface 20 so that the area beneath the frame assembly section 12 can be kept completely clear.

As best illustrated in FIGS. 1 and 2, each leg angle 22 includes a generally upwardly extending web portion 32 which terminates in an upper edge 33 and illustratively has a height of 4.8125 inches (12.223 cm.), a generally inwardly extending flange or foot portion 34 angularly formed with the web portion 32, and a generally upwardly extending lip portion 36 projecting angularly from the flange portion 34 so that the leg angle 22 has a generally J-shaped cross section. As can best be seen in FIG. 2, the flange portion 34 of the leg angle 22 rests on the base or floor surface 20 and the upper edge 33 of the web portion 32 and either a short side 26 or a long side 28 of the connecting cross-tie member 24 provide a planar support surface 38 for the side support members 14. Continuing to refer more particularly to FIG. 2, it should be noted that when the cross-tie member 24 is secured to the leg angle 22, it is elevated in spaced relationship to the base or floor surface 20 by the upturned lip portion 36 of the leg angle 22, thereby providing an open space 42 between the flange 34 of the leg angle 22 and the cross-tie member 24. Accordingly, a screw or other means 44 can be projected through the flange 34 of the leg angle 22 to secure the frame assembly section 12 to the base or floor surface 20.

While not shown in detail in the figures, it should be noted that the cross-tie member 44 employed at an end of the conveyor system 10 may include an angle bar, that is, a bar having an L-shaped cross section. An end cross-tie member 44 does not bear the weight normally experienced by cross-tie members 24 supporting the side support members 14. Accordingly, the end cross-tie members 44 do not necessarily need to be constructed in the same fashion as the cross-tie members 24.

Turning now to FIGS. 1–4, each side support member or rail 14 of a frame assembly section 12 according to the present invention includes a generally inwardly extending flange portion 50 which is secured to the planar support surface 38 provided by the upper edge 33 of the leg angle 22 and the cross-tie member 24 by welding, screws, or the like, and which illustratively has a width of 2.5 inches (6.35 cm.). As can best be seen in FIG. 2, the flange portion 50 extends and projects outward so that it overhangs the web portion 32 of the leg angle 22 by approximately 0.750 inch (1.905 cm.). The side support member or rail 14 also includes a generally upwardly extending web portion 52 formed angularly with the flange portion 50 and has a substantial height such as, for example, 6.5 inches (16.51 cm.). Accordingly, the side support member 14 is generally L-shaped in cross section.

The web portion 52 of the support member or rail 14 includes a plurality of sections provided in a plurality of different planes so that the web portion 52 is generally Y-shaped in cross section. The web portion 52 includes a lower planar section 54 provided in an outer plane 56 and angularly formed with the flange portion 50 of the side support member 14. Formed adjacent to the lower planar section 54 is an inwardly projecting shoulder 58 connecting the lower planar section 54 to an intermediate planar section 60 which is provided in an intermediate plane 62. Upwardly extending from the intermediate planar section 60 is an inwardly inclined oblique section 63 which connects the intermediate planar section 60 to an upper planar section 64 provided in an inner plane 66. The upper planar section 64 terminates in an upper edge 68. It can therefore be seen that the lower, intermediate, and upper planar sections 54, 60, and 64 are provided in three different generally vertical planes 56, 62, and 66, respectively.

The upper planar section 64 of the web portion 52 includes a plurality of U-shaped notches or cut-outs 70 opening at the upper edge 68 of the upper planar section 64. The U-shaped notches 70 are spaced apart longitudinally along the elongated support member or rail 14 by distances equal to the desired spacing between the transverse axes 18 of the rollers 16. Illustratively, the centers of the U-shaped notches 70 are spaced approximately 3.00 inches (7.62 cm.) apart. Each of the notches 70 includes two opposed spaced vertical side walls 72 terminating in a V-shaped closed end 74 and are dimensioned to receive hexagonal or pentagonal journals or shafts 76 on which the rollers 16 are freely rotatable. Each of the notches 70 is cut to a depth of approximately 0.924 inch (2.347 cm.)

When the journals or shafts 76 of the rollers 16 are positioned in the notches 70, the side support members 14 in combination with the leg angles 22 support the top surfaces 19 of the rollers 16 approximately 12.000 inches (30.48 cm.) above the base or floor surface 20 as generally indicated by the numeral 78 in FIG. 2.

In order to reinforce the web portion 52 of the side support members 14, inner reinforcement plates 80 of approximately 4 inches (10.16 cm.) in height angularly engage the bottom of the inwardly projecting shoulder section 58 of the web portion 52 and the flange portion 50. The reinforcement plates 80 are secured to the web portion 52 and flange portion 50 of the side support member 14 by welding or other securing means, and are positioned so that they correspond in location to the leg angles 22 and cross-tie members 24. Illustratively, the reinforcement plates 80 are secured to the flange portion 50 approximately 0.500 inch (1.27 cm.) from the inner edge of the flange portion 50.

As best illustrated in FIGS. 2 and 4, each side support member or rail 14 further includes an elongated longitudinally extending upper planar side member 82 which is secured to the intermediate planar section 60 of the web portion 52 by welding, screws, or the like. The upper side member 82 is approximately 2.00 inches (5.08 cm.) in width and is provided in generally the same outer plane 56 as the lower planar section 54 of the web portion 52 so that the side support member or rail 14 has a generally smooth uniform planar outer surface having no protuberances projecting outwardly therefrom. The upper side member 82 and the upper planar section 54 of the web portion 52 form a generally Y-shaped in cross section upper end of the web portion 52, thereby producing a longitudinally extending, upwardly opening channel 84, as best shown in FIG. 4. It can be seen in FIG. 4 that the journals or shafts 76 of the rollers 16 when received in the notches 70 project into the channel 84 and are concealed from the exterior or outer surface of the side support member or rail 14 by the upper side member 82. Importantly, the upper side member 82 does not bear any loads, and is primarily provided for cosmetic purposes to provide a smooth continuous outer surface for the side support member 14. For this reason, the upper side member 82 does not necessarily need to be secured to the web portion 52 in a manner so that it is capable of bearing a load.

Referring now particularly to FIG. 4, the side support member 14 according to the present invention also includes an outer removable side piece 86 which is frictionally secured to the web portion 52 of the support member 14 to retain the rollers 16 within respective notches 70. The outer side piece 86 is provided in elongated sections which are easily snapped into place on the side member 82 and include a central web portion 88 having generally the same 2.000 inch (5.08 cm.) width as the upper side member 82. The outer side piece 86 further includes a short inwardly extending, upwardly inclined lower flange 90 for engaging the bottom edge of the upper side member 82 and an inwardly extending, upwardly inclined upper flange 92 having a downwardly projecting lip 94 which engages the upper planar section 64 and upper edge 68 of the web portion 52 and which projects into the space 95 between the upper planar section 64 and the rollers 16 to limit upward movement of the journals or shafts 76. It can also be appreciated that the outer side piece 86 covers the upwardly opening channel 84 to prevent material from being dropped into the channel 84 and further adds to the overall aesthetic appearance of the frame assembly section 12. The outer side piece 86 is easily installed by first engaging the upper edge 68 of the upper planar section 64 with the upper flange 92 and downwardly extending lip 94 of the side piece 86 and thereafter forcing the lower flange 90 of the side piece 86 into frictional engagement with the lower edge of the upper side member 82. The side piece 86 is also removed by reversing the steps enumerated above; however, the frictional forces associated with the engagement of the web portion 52 are sufficient to limit accidental removal of the side piece 86.

Each of the frame assembly sections 12 includes means for coupling the sections together to form an elongated roller conveyor system 10. Each of the side support members or rails 14 includes in proximity to its ends, illustratively approximately 0.750 inch (1.905 cm.) from the ends, an aperture (not shown) in the lower planar section 54 of the web portion 52 and an aperture (not shown) in the flange portion 50. As can best be seen in FIGS. 1 and 2, two frame assembly sections 12 according to the present invention are connected together by coupling bars or plates 96 secured to the inside of each frame assembly section 12 by screws 98 or the like employing the apertures. Furthermore, a rectangular wedge 100 is positioned in the upwardly opening channel 84 at the point of connection of the two frame assembly sections 12 to further restrict lateral movement of a section 12 with respect to an adjacent section 12.

In accordance with the drawings and above description of the side frame assembly 12 of the present invention, it can therefore be appreciated that the frame assemblies 12 provide a clean and smooth outward appearance having no outwardly projecting protuberances and the side support members 14 are elevated in spaced relationship to the base or floor surface 20 with relatively minimal contact with the base or floor surface 20 for securing the frame assembly sections 12 thereto, thereby allowing access underneath the conveyor system 10.

What is claimed is:

1. In a frame assembly for a conveyor system including an elongated side rail for supporting rollers for rotation about transverse axes which are suitably spaced apart in the longitudinal direction of the conveyor system, the improvement wherein the side support rail is generally L-shaped in cross section and includes a generally inwardly extending flange portion and a generally upwardly extending web portion angularly formed with the flange portion, the web portion including a lower section connected to the flange portion in an outer vertical plane, an inner upper section in an inner vertical plane, an outer upper section in the outer vertical plane providing a generally planar exterior frame surface, the upper sections forming a channel which is generally Y-shaped in cross section, the channel having an open top and extending in the longitudinal direction of the conveyor system, support means on the inner upper section for receiving the rollers, and a removable outer cover member for closing a longitudinal segment of the open top of the channel to retain selected rollers in the support means.

2. The improvement as recited in claim 1 wherein the support means includes a plurality of upwardly opening load-bearing notches in the inner upper section for supporting the rollers, the notches being spaced apart longitudinally along the inner upper section by distances equal to desired spacing between the transverse axes of the rollers.

3. The improvement as recited in claim 2 wherein the notches include opposed spaced vertical side walls terminating in a V-shaped closed end for receiving shafts on which the rollers are freely rotatable.

4. The improvement as recited in claim 2 wherein the web portion further includes an intermediate section provided in an intermediate generally vertical plane, the intermediate plane being generally parallel to the outer and inner planes and perpendicular to the transverse axes of the rollers.

5. The improvement as recited in claim 4 wherein the web portion further includes an inwardly projecting shoulder section connecting the lower and intermediate sections and an inwardly extending oblique section connecting the intermediate and inner upper section, the intermediate and upper sections being generally planar.

6. The improvement as recited in claim 5, further including at least one inner reinforcement plate angularly engaging and secured to the inwardly projecting shoulder section of the web portion and to the inwardly extending flange portion to support the load-bearing upper and intermediate sections of the web portion.

7. The improvement as recited in claim 1 wherein the outer cover member includes inwardly extending, upwardly inclined lower and upper flanges for frictionally engaging the web portion of the side rail and an intermediate portion interconnecting the flanges, the upper flange being generally U-shaped and including a downwardly extending lip which projects into a space provided between the inner upper section of the web portion and the rollers, the upper flange covering the longitudinal segment of the open top of the channel, and the lower flange engaging a lower edge of the outer upper section.

8. A side frame assembly for a conveyor system, comprising two parallel upright side support members elongated for supporting rollers for rotation about transverse axes which are suitably spaced apart in the longitudinal direction of the conveyor system, the side support members each including an upwardly extending web and an inwardly extending flange, at least two leg angles for elevating the support members in spaced relationship to a base surface, each leg angle is generally J-shaped in cross section and includes an upwardly extending web, a flange extending inwardly from the web and a lip extending upwardly from the flange, and at least one cross member connecting the two leg angles, the cross member including an upper planar support surface, the inwardly extending flanges of the side support members being connected to the support surface, the cross member resting on the lips of the leg angles so that it is elevated in spaced relationship to the base surface.

9. The assembly as recited in claim 8 wherein the flanges of the side support members outwardly overhang the leg angles.

10. The assembly as recited in claim 9 wherein the cross member is generally rectangular shaped in cross section having short sides and long sides, the long sides being generally twice as wide as the short sides to allow two cross members to be stacked on their long sides, thereby providing a support surface equivalent in height to one cross member turned on one of its short sides.

11. A side support member for supporting rollers for rotation about transverse axes in a conveyor system, comprising a profiled upright rail generally L-shaped in cross section extending longitudinally in the direction of the conveyor system, the rail including an inwardly extending flange portion and an upwardly extending web portion generally Y-shaped in cross section, the web portion including a lower section provided in an outer plane, a first upper section provided in an inner plane, a second upper section provided in the outer plane, the lower section and the second upper section producing a generally planar exterior rail surface, and means for supporting the rollers provided in the first upper section, the first and second upper sections forming a channel having an open top for placement and removal of the rollers with respect to the supporting means.

12. The side support member as recited in claim 11 wherein the web portion further includes an inwardly projecting shoulder section between the lower section and the two upper sections.

13. The side support member as recited in claim 12 further including at least one inner reinforcement plate angularly engaging the inwardly projecting shoulder section and the inwardly extending flange portion to support the load-bearing first upper section of the web portion.

14. The side support member as recited in claim 13 further including a removable outer cover member frictionally engaging the web portion for retaining the rollers within the supporting means in the first upper section.

15. In a frame assembly for a conveyor system including an elongated side rail for supporting rollers for rotation about transverse axes which are suitably spaced apart in the longitudinal direction of the conveyor system, the improvement wherein the side support rail is generally L-shaped in cross section and includes a generally inwardly extending flange portion and a generally upwardly extending web portion angularly formed with the flange portion, the web portion forming a channel having an open top and extending in the longitudinal direction of the conveyor system, the web portion including a lower section in an outer generally vertical plane, a first upper section in an inner generally vertical plane, a second upper section in the outer vertical plane, an inwardly projecting shoulder section between the lower and upper sections, support means on the first upper section for receiving the rollers, and a reinforcement member between the inwardly projecting shoulder section and the inwardly extending flange portion to support the load-bearing first upper section of the web portion, the lower section and the second upper section producing an exterior frame surface in generally a single plane.

16. The improvement of claim 15 further comprising a removable outer cover member engaging the upper sections of the web portion for closing a longitudinal segment of the open top of the channel to retain selected rollers in the support means on the first upper section.

17. A side frame assembly for a conveyor system comprising two parallel upright side support members elongated for supporting rollers for rotation about transverse axes which are suitably spaced apart in the longitudinal direction of the conveyor system, the side support members each including an upwardly extending web and an inwardly extending flange, the web of each support member including a lower section connected to the flange in an outer vertical plane, an inner upper section in an inner vertical plane, an outer upper section in the outer vertical plane producing a generally planar exterior frame surface, the upper sections forming a channel which is generally Y-shaped in cross section, the channel having an open top and extending in the longitudinal direction of the conveyor system, support means on the inner upper section for receiving the rollers and a removable outer cover member for closing a longitudinal segment of the open top of the channel to retain selected rollers in the support means, at least two leg angles for elevating the support members in spaced relationship to a base surface, each leg angle being generally J-shaped in cross section and including an upwardly extending web, a flange extending inwardly from the web and a lip extending upwardly from the flange, and at least one cross member connecting the two leg angles, the cross member including an upper planar support surface, the inwardly extending flanges of the side support members being connected to the support surface, and the cross member resting on the lips of the leg angles so that it is elevated in spaced relationship to the base surface.

* * * * *